(12) United States Patent
Mahate et al.

(10) Patent No.: US 10,074,402 B2
(45) Date of Patent: Sep. 11, 2018

(54) RECORDING AND PROVIDING FOR DISPLAY IMAGES OF EVENTS ASSOCIATED WITH POWER EQUIPMENT

(71) Applicant: ABB Research Ltd., Zurich (CH)

(72) Inventors: Shakeel M. Mahate, Raleigh, NC (US); Karen J. Smiley, Raleigh, NC (US)

(*) Notice: Subject to any disclaimer, the term of this patent is extended or adjusted under 35 U.S.C. 154(b) by 54 days.

(21) Appl. No.: 13/894,691

(22) Filed: May 15, 2013

(65) Prior Publication Data

US 2014/0341528 A1 Nov. 20, 2014

(51) Int. Cl.
*G11B 27/32* (2006.01)
*H04N 5/91* (2006.01)
*G06K 9/00* (2006.01)

(52) U.S. Cl.
CPC .......... *G11B 27/32* (2013.01); *G06K 9/00711* (2013.01); *H04N 5/91* (2013.01); *G05B 2219/32014* (2013.01)

(58) Field of Classification Search
CPC .......... G06F 7/00; G06F 17/30; G06Q 10/00; G05B 15/00; G05B 2219/32014; G11B 27/32; G06K 9/00711; H04N 5/91
See application file for complete search history.

(56) References Cited

U.S. PATENT DOCUMENTS

| 4,227,177 A * | 10/1980 | Moshier | G10L 15/00 704/231 |
| 2002/0019737 A1* | 2/2002 | Stuart | G10L 15/26 704/275 |
| 2004/0056907 A1* | 3/2004 | Sharma | G10L 15/24 715/863 |
| 2006/0241792 A1* | 10/2006 | Pretlove et al. | 700/83 |

(Continued)

FOREIGN PATENT DOCUMENTS

WO 20120142250 A1 10/2012

OTHER PUBLICATIONS

"Google Wins the Internet With a Live Skydiving Demo of Google Glass (Now With Video!)", http://techcrunch.com/2012/06/27/sergey-brin-demos-google-glass-at-io/, Jun. 27, 2012, pp. 1-3.

(Continued)

*Primary Examiner* — Amr Awad
*Assistant Examiner* — Wing Chow
(74) *Attorney, Agent, or Firm* — Barnes & Thornburg LLP

(57) ABSTRACT

Among other things, one or more techniques and/or systems are provided for identifying event images captured during an event associated with power equipment, such as a maintenance action. An entity, such as a maintenance technician, is equipped with an image recorder and an audio recorder. In some embodiments, the image recorder and/or audio recorder are wearable, such as mounted to eyewear and/or (Continued)

headwear worn by the entity. Audio that is recorded by the audio recorder is processed to identify events (e.g., key actions in a maintenance procedure). Based upon the identification of an event from the audio, event images (e.g., images captured temporally proximate to when the event was identified in the audio) associated with the event are identified and stored in a library. In some embodiments, one or more of such event images are later displayed to entities via a heads-up display, for example.

20 Claims, 7 Drawing Sheets

(56) References Cited

U.S. PATENT DOCUMENTS

| | | | | |
|---|---|---|---|---|
| 2008/0052080 | A1* | 2/2008 | Narayanan | G06F 17/2785 704/270 |
| 2008/0172242 | A1* | 7/2008 | Hyatt | 705/1 |
| 2009/0157746 | A1* | 6/2009 | More et al. | 707/104.1 |
| 2011/0246409 | A1* | 10/2011 | Mitra | G06F 17/18 706/52 |
| 2012/0075343 | A1 | 3/2012 | Chen et al. | |
| 2012/0219157 | A1* | 8/2012 | Hosaka | G01H 7/00 381/56 |
| 2013/0182865 | A1* | 7/2013 | Paul | G10K 11/178 381/71.8 |

OTHER PUBLICATIONS

Swanner, Nate, "Is Google Glass the future, or just a flop?", http://www.androidauthority.com/google-glass-future-flop-149348/ , Jan. 22, 2013, pp. 1-13.

"Project Glass", http://en.wikipedia.org/wiki/Project_Glass, Apr. 8, 2012, pp. 1-4.

Int. Search Report cited in PCT Application No. PCT/US2014/ 038073 dated Oct. 1, 2014, 11pgs.

Augmented Maintenance of Powerplants: A Prototyping Case Study of a Mobile AR System, Augmented Reality, 2001, Proceedings. IEEE and ACM International Sympo Sium on New York, USA, Oct. 29-30, 2001 pp. 124-133, Klinker et al.

* cited by examiner

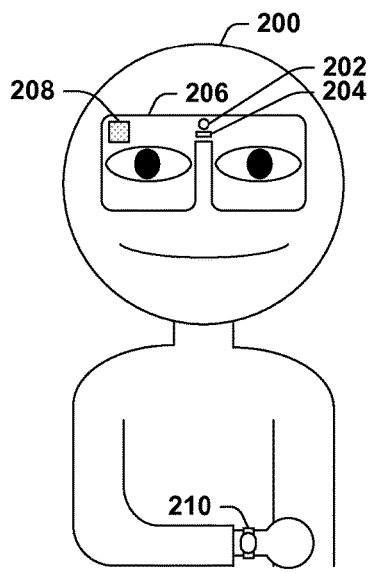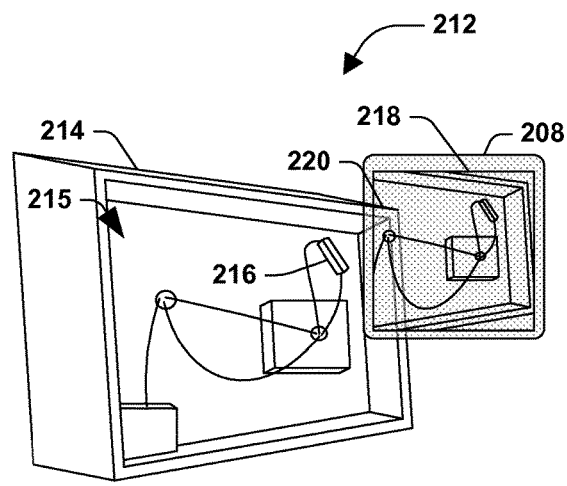
FIG. 2a    FIG. 2b
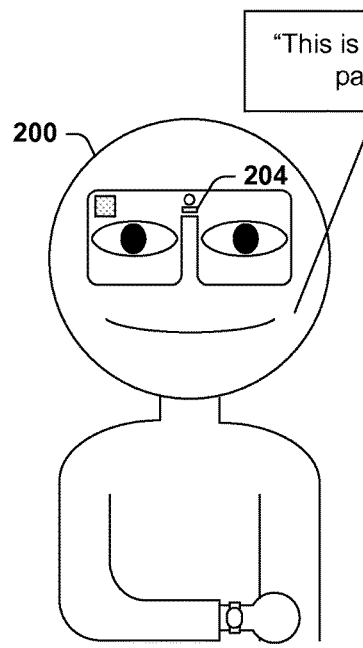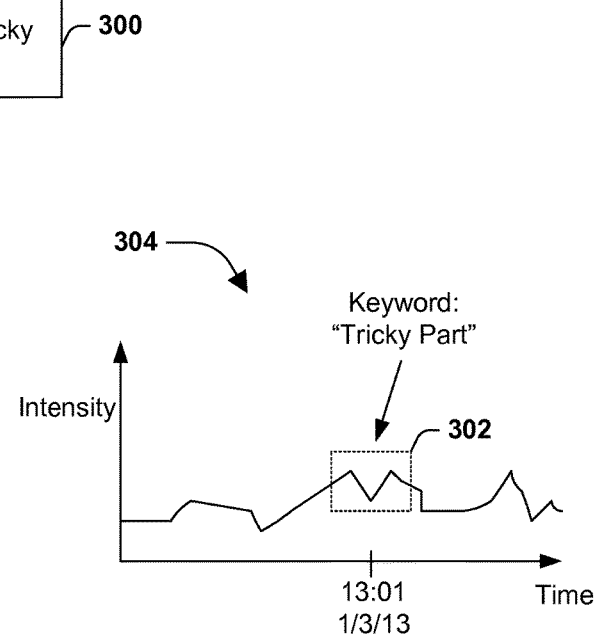
FIG. 3a    FIG. 3b

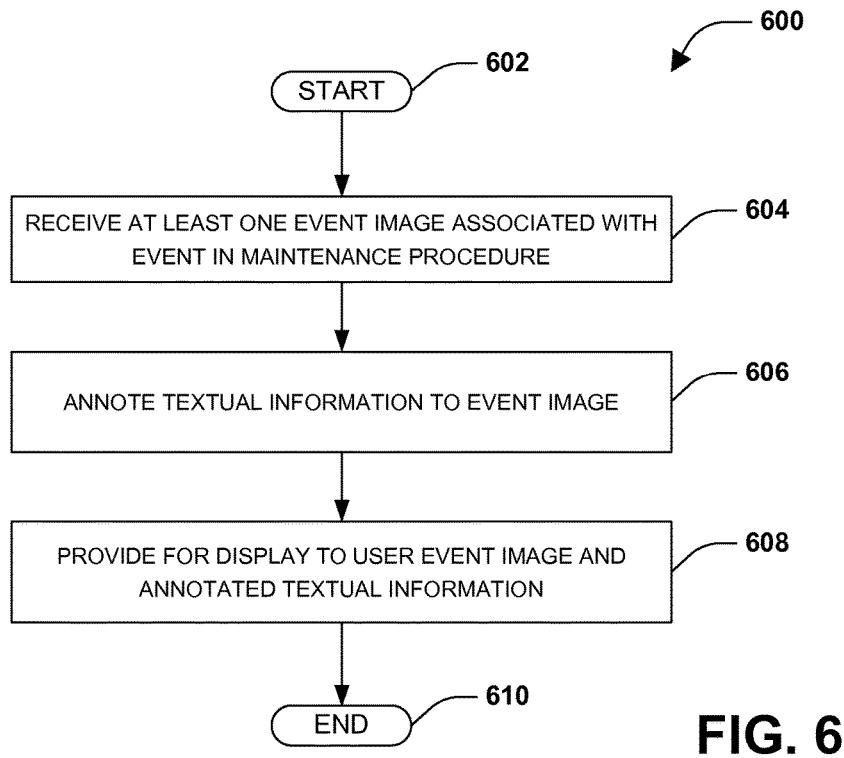
FIG. 6
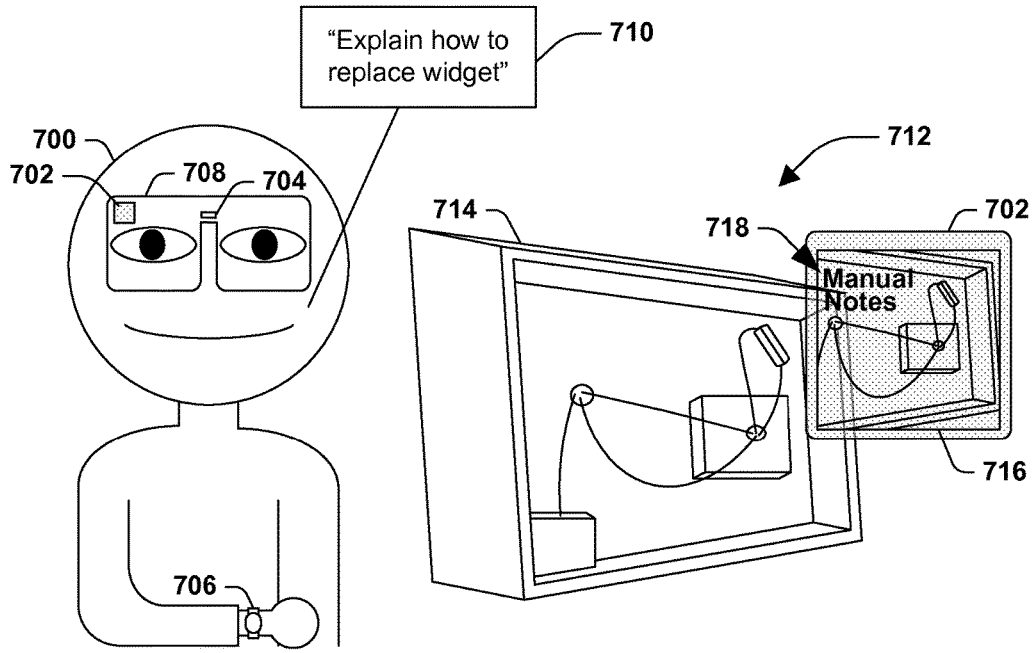
FIG. 7a  FIG. 7b

RECORDING AND PROVIDING FOR DISPLAY IMAGES OF EVENTS ASSOCIATED WITH POWER EQUIPMENT

BACKGROUND

The present application relates to power equipment and more particularly to systems and/or techniques for capturing images of maintenance procedures associated with the power equipment (e.g., performed on the power equipment), identifying event images representing key events in the maintenance procedure, and/or storing the event images for later retrieval by users desiring to review the maintenance procedure.

A power system comprises a network of electrical components or power equipment configured to supply, transmit, and/or use electrical power. For example, a power system may include, among other things, turbines, transformers, circuit breakers, capacitors, voltage regulators, and/or power lines. Due to the complex nature of such power equipment and/or safety protocols associated with such power equipment, maintenance of such power equipment is typically performed by highly trained maintenance technicians.

While such maintenance technicians may receive some of their training in the classroom and/or by performing simulations, often much of their training and/or knowledge is acquired on-site while working with other, more experienced, maintenance technicians. As these more experienced maintenance technicians begin to retire from the workforce, much of their knowledge and expertise is being lost.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to an aspect, a method for identifying an event image associated with an event in a maintenance procedure associated with power equipment is provided. The method comprises recording, via a wearable image recorder, images associated with the maintenance procedure and recording, via an audio recorder, audio associated with the maintenance procedure. The method also comprises temporally correlating the images with the audio, and identifying an event image based upon at least one of the audio (e.g., one or more audio snippets, one or more audio samples, and/or other one or more portions of audio), which is temporally correlated with the images, or the images.

According to another aspect, a system for identifying an event image captured during an event associated with power equipment is provided. The system comprises an image recorder configured to capture images of the power equipment, and an audio recorder configured to capture audio. The system also comprises a correlation component configured to temporally correlate the images with the audio, and an event association component configured to identify, based upon the audio, when the event occurs and to identify, based upon the temporal correlation, the event image from the images.

According to yet another aspect, a method is provided. The method comprises receiving a request to display images pertaining to an event to be performed on power equipment, and identifying an event image pertaining to the event. The method also comprises providing the event image for display on a heads-up display worn by a user designated to perform the event on the power equipment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 2a illustrates an example scenario for recording imagery and/or audio of a maintenance procedure.

FIG. 2b illustrates an example scenario for recording imagery and/or audio of a maintenance procedure.

FIG. 3a illustrates an example scenario for recording imagery and/or audio of a maintenance procedure.

FIG. 3b illustrates an example scenario for analyzing an audio recording during a maintenance procedure.

FIG. 6 is a flow diagram illustrating an example method for annotating textual information to an event image.

FIG. 7a illustrates an example scenario for receiving commands and presenting event images based upon the commands.

FIG. 7b illustrates an example scenario for receiving commands and presenting event images based upon the commands.

DETAILED DESCRIPTION

Figure 1:
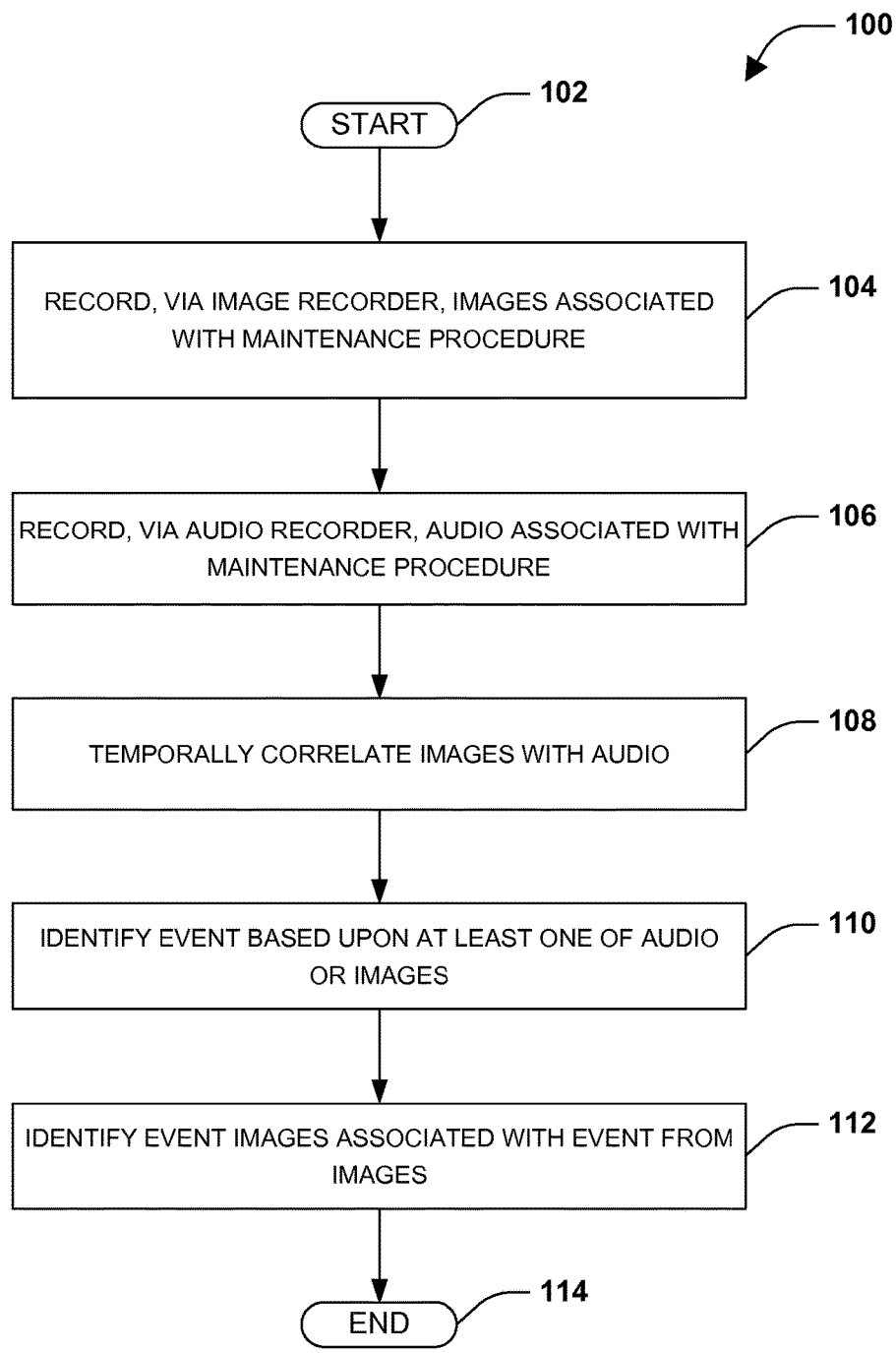
FIG. 1 is a flow diagram illustrating an example method for identifying an event image associated with an event in a maintenance procedure associated with power equipment.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

The diversity of power equipment within a power system is often vast, and maintenance technicians are typically expected to perform maintenance on a wide array of power equipment. While maintenance technicians may undergo extensive training in the classroom and/or via simulations, often conditions present on a job-site differ from those experienced in the classroom and/or via simulations. Over time, maintenance technicians develop knowledge and/or expertise from these job-site experiences that are not recorded or otherwise documented. When maintenance technicians leave a company, their knowledge and/or expertise may be lost by the company unless it has been imparted to other maintenance technicians within the company.

Accordingly, developing a library of such knowledge may be desirable. The library provides a database of information that a lesser experienced maintenance technician, for example, may utilize when performing an unfamiliar maintenance procedure and/or when encountering an unfamiliar event/scenario during an otherwise routine maintenance procedure. Other example uses of such a library may be to review the work of maintenance technicians (e.g., such as by a supervisor or quality control specialist) and/or to investigate a cause of a failure, fire, etc. at the power equipment after the maintenance procedure was complete.

As provided herein, the library is developed, at least in part, from images and/or audio recorded (e.g., acquired) during maintenance procedures performed on the power equipment. Such maintenance procedures may include, among other things, inspections, field-testing, repair actions, and/or replacement actions, for example. To record images, a maintenance technician may be equipped with an image recorder, which may record images (e.g., in the form of video segments or still images) associated with the maintenance procedure, such as images of actions performed during the maintenance procedure. The maintenance technician may also be equipped with an audio recorder configured to detect audio associated with the maintenance procedure, such as the maintenance technician's description of what is being performed. Using the audio, images depicting important events in the maintenance procedure (e.g., sometimes referred to as event images) may be identified and/or filtered from other images of the maintenance procedure to reduce a volume of data in a library, for example. By way of example, a maintenance procedure may take an hour to perform and the image recorder may record substantially all of the maintenance procedure. However, merely 5 minutes of the recording may represent important events of the maintenance procedure (e.g., tricky steps in the procedure). Accordingly, based upon the audio, for example, one or more images (e.g., still images or video segments) representative of the 5 minutes of important events can be identified and/or filtered from images generated during the remaining 55 minutes of maintenance.

In some embodiments, the image recorder and/or the audio recorder are wearable by the maintenance technician. By way of example, the image recorder and/or the audio recorder may be coupled to an elastic band or helmet that the maintenance technician can attach to his/her head. As another example, the image recorder and/or audio recorder may be coupled to and/or embedded within eyewear, a wristwatch, and/or other accessory worn by the maintenance technician.

In some embodiments, images stored in the library may be later retrieved by the maintenance technician or other maintenance technicians when performing similar maintenance procedures. By way of example, a maintenance technician may request images illustrating how to perform the replacement of a particular component within the power equipment (e.g., or other power equipment that is similarly configured) and images depicting such a procedure may be retrieved from the library. In some embodiments, such images may be displayed in a heads-up display, such as associated with eyewear worn by the maintenance technician. In other embodiments, such images may be displayed on a display of a wristwatch or other wearable accessory, for example. In still other embodiments, such images may be displayed on a mobile telephone, tablet, or personal computer, etc., for example.

FIG. 1 illustrates an example method 100 for identifying an event image associated with an event in a maintenance procedure associated with power equipment. In some embodiments, the example method 100 is applicable for separating images associated with key steps or actions in the maintenance procedure from other images recorded during a maintenance procedure. It may be appreciated that the phrase maintenance procedure is used herein to broadly refer to an action performed on or with respect to an apparatus (e.g., any one or more portions of any one or more pieces of equipment, etc.), such as by a maintenance technician. Such actions may include, among other things, repairing the apparatus, replacing a component of the apparatus, performing an inspection on the apparatus, performing field-test to the apparatus, etc.

The example method 100 begins at 102, and images associated with the maintenance procedure are recorded via an image recorder at 104. In some embodiments, the images may be recorded in the form of a video segment(s). In other embodiments, the images may be recorded in the form of still images. In some embodiments the images may be recorded in the form of video segment(s), still images and/or any other imagery.

The images typically represent actions performed with respect to the power equipment during at least a portion of the maintenance procedure. By way of example, a maintenance technician may initialize the recording (e.g., by a voice command, by pressing a record button, by performing a specific gesture (e.g., winking), etc.) at the start of the maintenance procedure and allow the image recorder to continue recording for the duration of the maintenance procedure (e.g., to capture the entire procedure on video and/or in a series of still images (e.g., where a new still image may be captured periodically, such as every 10 seconds)). As another example, the maintenance technician may start and stop the recording as desired during the maintenance procedure such as via voice commands, gestures, and/or tactile commands (e.g., by engaging and disengaging a record button). In this way, the maintenance technician can pause the recording, for example, when performing routine procedures, such as when grabbing additional equipment from his/her vehicle.

In some embodiments, the image recorder is coupled to and/or embedded within an apparatus worn by the maintenance technician. For example, the image recorder may be embedded within eyewear, a helmet, a wristwatch, a pennant, etc. worn by the maintenance technician. In some embodiments, the image recorder further comprises a display where the maintenance technician can review (e.g., in real-time and/or via a play-back feature) the recorded images. By way of example, in some embodiments, the image recorder includes a heads-up display (e.g., comprising a projection unit and a projection screen, such as a piece of glass) configured to present the recorded images to the maintenance technician. In other embodiments, the image recorder may comprise a transmitter (e.g., such as a wireless transmitter) configured to provide an image feed to a display. By way of example, the image recorder may be embedded within eyewear and may be configured to transmit the images to a wristwatch, tablet, etc. comprising a storage component configured to store the images and/or a display configured to present at least some of the recorded image to the user.

At 106 in the example method 100, audio associated with the maintenance procedure is optionally and/or intermittently recorded via an audio recorder. A source of the audio may include the maintenance technician, the power equipment, and/or an environment surrounding the power equipment. By way of example, the maintenance technician may orally describe actions being performed on the power equipment, may note the complexity of particular actions during the maintenance procedure, and/or may instruct the image recorder to record or not record portions of the maintenance procedure. As another example, sounds generated by the power equipment may be recorded. By way of example, a particular vibration may be indicative of a failing part. Accordingly, the maintenance technician may wish to record a sound associated with the vibration so that other maintenance technicians who are performing a similar maintenance procedure may be aware to listen for the sound (e.g., which may help the other technicians troubleshoot an issue with the power equipment).

In some embodiments, the recorded audio is converted to a digital domain by the audio recorder, where the audio may sometimes be referred to as audio data. For purposes of the instant application, audio data and audio may be used synonymously.

In some embodiments, the audio recorder is coupled to and/or embedded within an apparatus worn by the maintenance technician, such as eyewear, a helmet, a wristwatch, a pennant, etc. Further, such an audio recorder may be coupled to and/or embedded within a same apparatus as the image recorder and/or may be coupled to and/or embedded within a different apparatus than the image recorder. For example, the image recorder may be embedded within eyewear while the audio recorder is embedded within a wristwatch.

Typically, at least some of the images are recorded contemporaneously with at least some of the audio. For example, at least some of 104 and at least some of 106 are performed in parallel. Accordingly, at 108 in the example method 100, the images are temporally correlated with the audio. That is, the images are substantially synchronized with the audio such that the images are matched to the audio (e.g., the images are matched to what the maintenance technician is describing), for example.

In some embodiments, such a correlation is performed based upon metadata associated with the recorded audio and/or recorded images. By way of example, metadata associated with the images may include timestamps descriptive of a time when respective images was recorded and metadata associated with the audio may include timestamps descriptive of a time when the audio was recorded. Using such timestamps, the images may be temporally correlated with the audio (e.g., so that a maintenance technician's description of an action temporally coincides with images depicting the action). It may be appreciated that such a technique may find particular application to still images, where image data and audio data may be stored in disparate formats (e.g., the images may be stored as jpegs and the audio may be stored as mp3s), for example. However, it may also find application where the image data is a video segment(s).

As another example, the recorded images and audio may be stored in a multimedia format configured to store both the images and audio in a single file format and the correlation may occur as part of the formatting process to merge an audio stream with an image stream for storage in the multimedia format. By way of example, the images and audio may be stored in an mpeg-4 format and an audio stream from the audio recorder may be correlated with a video stream or image stream from the image recorder as part of the formatting process to derive a multimedia format comprising both imagery and audio, for example. Such a technique may find particular application to video images, for example, where the audio recorder and video recorder are continuously and contemporaneously recording sounds and imagery, respectively, for example. However, it may also find application where the images are still images.

At 110 in the example method 100, an event associated with the maintenance procedure is identified based upon at least one of the audio or the video. As used herein, an event generally describes a discrete action performed with respect to the maintenance procedure. Stated differently, an event may refer to a discrete step or act of the maintenance procedure. For example, the maintenance procedure may include replacing a component of the power equipment and the events performed during the maintenance procedure may include removing clips to access the component, uncoupling a wire harness to access the component, and/or removing a screw to decouple the component from the power equipment. As another example, the maintenance procedure may include performing a field-test on dissolved gases in a fluid and events performed during the maintenance procedure may include removing a cap to access the fluid, extracting a portion of the fluid from a fluid reservoir, and/or applying the extracted fluid to a test strip.

In some embodiments, analytical, iterative, or other voice recognition techniques are performed on the audio to identify events associated with the maintenance procedure. For example, in some embodiments, a set of predefined keywords (e.g., which may include key phrases) are paired in a library with one or more events, and the audio is analyzed to determine if one or more instances of such keywords are present in the audio. If a keyword is identified as being present in the audio, it may be determined that an event paired with the keyword occurred temporally proximate to when the keyword was recorded.

By way of example, during a maintenance procedure, a maintenance technician may orally describe the actions he/she is performing and the description may be recorded by the audio recorder and represented in audio data. Such audio data may be analyzed using voice recognition techniques to identify instances during the maintenance procedure when key actions or events occurred. By way of example, the voice recognition technique may be configured to identify instances in the audio data where a keyword was spoken by the maintenance technician and recorded. If an instance of the keyword is identified in the audio data, it may be predicated that an event associated with the keyword occurred temporally proximate to when the keyword was spoken. By way of example, the voice recognition technique may identify the phrase "remove exterior shell" in the audio data at time X in the recording, determine that such a phrase is associated with the removal of a cap (e.g., the event), and may predict that cap was being removed proximate time X. Accordingly, a cap removal event may be identified at time X.

In some embodiments, the voice recognition technique may not be configured to determine the nature the event (e.g., the precise step or action that is occurring), but rather is merely configured to determine that an important or challenging event is occurring. By way of example, a maintenance technician may orally note that an action is complicated or tricky, which may be recorded by the audio recorder and represented in audio data generated by the audio recorder. When the audio data is analyzed using voice recognition techniques, the notation regarding the complexity or trickiness of the action may be identified. In this way, complex or tricky actions in the maintenance procedure may be identified as events without necessarily identifying the particular action that is occurring (e.g., without determining if the event relates to removing a wire harness, removing a screw, etc.).

In other embodiments, the audio may be analyzed using techniques configured to identify non-verbal cues in speech or audio. By way of example, during complex actions of a maintenance procedure, the tone of a maintenance technician's voice, breaks between words, or other voice nuances may change, indicating an elevated level of stress. Audio data generated by the audio recorder may thus be processed using audible stress techniques (e.g., configured to identify stress in audio recordings) to detect such vocal changes. Instances where the maintenance technician's voice is indicative of an elevated level of stress may be identified as corresponding to a complex action (e.g., an event) in the procedure, for example.

In still some embodiments, events may be identified based upon the images. By way of example, an imaging analytic technique may be performed on the images recorded by the image recorder to identify a trigger image, indicative of the start of an event of interest. By way of example, it may be desirable to record how maintenance technicians replace a particular component within a particular type of industrial asset. Accordingly, the images may be analyzed to determine a particular action that immediately proceeds replacing the particular component. For example, the maintenance technicians may always remove a cap concealing the particular component prior to replacement of the particular component. In such an example, an image representing the cap being removed may be identified as an event of interest.

In some embodiments, such an imaging analytic technique(s) is trained via one or more machine learning techniques. For example, a user may manually review images (e.g., such as video segments) and tag events represented in the images. Based upon this user input, a machine learning technique may identify trends in the images that are highly predictive of a particular event occurring. For example, the machine learning technique may identify features of an image (e.g., objects represented in the image, colors of pixels, intensity of pixels, etc.) that generally merely appear in an image when an event is occurring. Based upon this training, an imaging analytic technique can be developed that analyzes respective images to identify such features, and when a specified feature(s) are present in an image, label the image as corresponding to an event associated with the specified feature(s).

At 112 in the example method 100, event images associated with the event are identified from the images recorded at 104. That is, one or more images generated in close temporal proximity to an occurrence of an event, as determined from the audio processing and/or image processing, may be identified as event images (e.g., depicting the event). By way of example, based upon an analysis of audio at 110, it may be determined that an event occurred at time Y. Given that the images have been temporally correlated with the audio at 108, images recorded at approximately time Y may be identified as event images (e.g., associated with or representative of the event). As another example, the start of an event may be identified from an image and images acquired in close temporal proximity to the identified image may be identified/labeled as event images.

The number of images (e.g., or length of video segment) that are identified as event images may be based upon user specified criteria. By way of example, in some embodiments, a user may specify that images recorded within a defined time window of a keyword being spoken (e.g., within 10 seconds (e.g., before and/or after) of a keyword being spoken) are identified as event images for the event. In other embodiments, time window may be more dynamic in nature. For example, the user may specify that images recorded during a period of time when the audio is indicative of a stressed voice are to be identified as event images for the event (e.g., and thus the length of the time window depends upon how long the maintenance technician's voice sounds stressed). As another example, the user may specify another trigger to begin and/or end the time window. By way of example, the user may specify that the time window begins at a time when the event is identified and continues until a particular word is spoken by the maintenance technician (e.g., the time window of the event ends when the keyword "action complete" is recognized from the audio data).

The example method 100 ends at 114 after one or more event images associated with an event identified at 110 are identified.

In some embodiment, such event images are stored in a library (e.g., along with audio of the event) and/or are accessible by other entities, such as other maintenance technicians performing similar maintenance procedures on similar power equipment, for example. As still other examples, the event images and/or associated audio may be accessible by supervisors to review the maintenance technician's performance and/or by compliance officers responsible for verifying that the maintenance procedure was performed in a manner that complied with guidelines, codes, etc. Further, as will be described in more detail below, such event images may be annotated with textual information, such as repair manuals, incident reports, event checklists, safety warnings, tips for performing the event, etc. In this way, when an entity accesses the one or more event images, the entity may also be presented with textual information relevant to the event (e.g., to provide further context for the event image(s)), for example.

Figure 4:
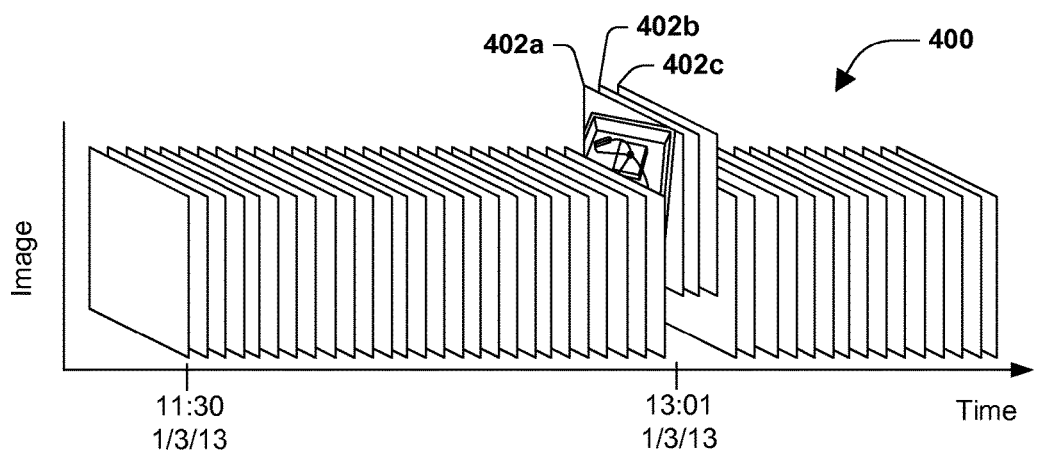
FIG. 4 illustrates an example set of images acquired during a maintenance procedure.

FIGS. 2-4 illustrate an example scenario where the method 100 of FIG. 1 may find applicability. It is to be appreciated that such an example scenario is merely intended to describe one such application, and the method 100 of FIG. 1 is not intended to be limited to such an application.

Referring to FIG. 2a, a maintenance technician 200 responsible for performing a maintenance procedure on power equipment is shown. The maintenance technician 200 is equipped with, among other things, an image recorder 202 and an audio recorder 204. In the example scenario, the image recorder 202 and the audio recorder 204 are embedded within (e.g., mounted to) eyewear 206 worn by the maintenance technician 200 (e.g., such as a pair of safety glasses). It may be appreciated that by placing the image recorder 202 spatially proximate to the maintenance technician's eyes, the image recorder 202 is configured to capture scenery similar to the scenery visible to the maintenance technician 200, for example. Further, the placement of the image recorder 202 and/or audio recorder 204 within eyewear and/or other wearable items may free the maintenance technician's hands to perform the maintenance procedure, for example.

In some embodiments, the maintenance technician 200 is further equipped with a display 208 configured to display images (e.g., still images or video segments) captured by the image recorder 202 and/or to display other information regarding the maintenance procedure. For example, the display 208 may be configured to display a repair guide (e.g., an instruction manual) and/or a checklist for the maintenance procedure. As another example, recorded images may be fed to a control center where a supervisor may monitor the progress of the maintenance procedure, and the supervisor can provide feedback via text messages displayed on the display 208, for example.

In the example scenario, the display 208 is embedded within (e.g., mounted to) the eyewear 206 worn by the maintenance technician 200. For example, the display 208 may comprise a heads-up display comprising a substantially transparent screen that allows the maintenance technician 200 to see through the display 208 and visualize content in a line-of-sight that impinges the display 208 (e.g., to allow the maintenance technician 200 to see objects that would be obstructed by the display 208 if the display 208 were not substantially transparent).

In some embodiments, at least one of the image recorder 202, audio recorder, and/or display 208 may communicate with a second device, such as a wristwatch 210 worn by the maintenance technician 200. By way of example, the image recorder 202 and/or audio recorder 204 may feed images and/or audio, respectively, to the wristwatch 210, where the images and/or audio may be stored in memory and/or transmitted to the control center. As another example, the maintenance technician 200 may interact with a user interface of the wristwatch 210 to initialize commands for the image recorder 202, audio recorder 204, and/or display 208, for example.

As described with respect to FIG. 1, the image recorder 202 may be configured to record images (e.g., video segments or still images) during a maintenance procedure performed by the maintenance technician 200, and the audio recorder 204 may be configured to detect sounds generated during the maintenance procedure. For example, the audio recorder 204 may be configured to record sounds generated by the maintenance technician 200.

FIG. 2b illustrates a scene 212 from the perspective of the maintenance technician 200 performing the maintenance procedure. By way of example, prior to the illustrated scene 212, the maintenance technician 200 may have removed a cover of the power equipment box 214, exposing an interior cavity 215 of the box 214. The maintenance technician 200 may now be peering into the box 214 in preparation for removing a cylindrical component 216 of the box 214. In some embodiments, such as the illustrated embodiment, an image 218 that is being recorded by the image recorder 202 may be presented (e.g., in real-time) to the maintenance technician 200 via the display 208, which in the present scenario is a heads-up display. Thus, the maintenance technician 200 can view the image 218 being recorded while also viewing the box 214 directly (e.g., to review what is being recorded while continuing to perform a maintenance procedure on the box 214).

In other embodiments, the display 208 may display other content besides and/or in addition to an image 218 presently being recorded. For example, the display 208 may present an instruction manual and/or text communications from one or more other entities. As another example, the display 208 can display images acquired during previous maintenance procedures performed on the same or other maintenance equipment. By way of example, the display 208 can display the interior cavity 215 of the box 214 during a previous maintenance procedure (e.g., such that the maintenance technician can determine if corrosion, structure fatigue, etc. has occurred within the box 214 since the previous maintenance procedure).

In some embodiments, such as in the illustrated embodiment, the display 208 and the image 218 are at least partially transparent, allowing the maintenance technician 200 to view aspects of the box 214 that would otherwise be hidden from view if the display 208 and/or the image 218 were opaque, for example (e.g., allowing the maintenance technician 200 to see an edge 220 of the box 214 that would be obstructed if the display 208 were opaque). In other embodiments, at least one of the display 208 206 and/or the image 218 are substantially opaque. For example, the display 208 may be substantially transparent while an image(s) 218 presented thereon are substantially opaque (e.g., allowing the maintenance technician to see through the display 208 when no image is displayed and to not see through the display 208 when an image is displayed).

As shown in FIG. 3a, while the maintenance technician is viewing the scene 212, the maintenance technician 200 may verbally note 300 that "this is a tricky part," which may be detected and/or recorded by the audio recorder 204.

When the audio is analyzed to identify one or more events in the maintenance procedure (e.g., key actions or complex actions in the maintenance procedure), as shown in FIG. 3b, voice recognition techniques may detect a signature 302, of a keyword associated with an event, in an intensity graph 304 (e.g., representative of the intensity of sound detected at a given time). For example, the signature 302 may correspond to the keyword "tricky part" which may be associated with a complex (e.g., tricky) action in the procedure. Accordingly, from an analysis of the intensity graph 304, it may be determined that an event (e.g., a complex action in the procedure) occurred at 13:01 on Jan. 3, 2013.

Turning to FIG. 4, based upon the identification of an event occurring at 13:01 on Jan. 3, 2013, one or more event images corresponding to the event may be identified. For example, over the course of a maintenance procedure, hundreds or thousands of still images 400 may be acquired. These images 400 may be organized chronologically and images recorded in close temporal proximity to a time of the event (e.g., a time in the audio recording when it was determined an event occurred), may be selected or identified as event images 402. By way of example, in the illustrated embodiment, three images 402a, 402b, 402c captured temporally proximate to 13:01 may be identified as event images and/or labeled as associated with the event. In some embodiments, images 400 that are not identified as event images 402 may be discarded (e.g., to reduce the length of a video and/or to reduce an amount of storage space required to store images of the maintenance procedure), for example. In this way, event images 402 may be filtered from non-event images (e.g., to reduce an amount of content stored in the database and/or mitigate the storage of images depicting routine actions in a maintenance procedure), for example.

It may be appreciated that in some embodiments, the precise nature of the event may be unknown from the audio analysis. By way of example, in the illustrated embodiment, the event was identified based upon the identification of "tricky part" in the audio data. Accordingly, it may be unknown whether the event pertains to removing the cylindrical component 216, replacing a wiring harness, etc. In some such embodiments, the event images 402 may be further analyzed to determine the nature of the event. For example, the maintenance technician may review event images after the maintenance procedure is complete to describe what action(s) are being represented by respective sets of one or more event images. As another example, one or more pattern recognition techniques may be applied to the event images to determine a nature of the event. For example, over a series of event images 402, the removal of the cylindrical component 216 may be shown (e.g., where a first event image 402a depicts the cylindrical component 216 and a later acquired event image 402c no longer depicts the cylindrical component 216). A pattern recognition technique may be configured to identify changes in the event images 402, and may determine that the cylindrical component 216 has been removed from the event images over a time window represented by the event images. A second pattern recognition technique may then be used to analyze the shape and/or other morphological characteristics of the removed cylindrical component 216 in the event images 402 to label the object. In this way, the event images can be associated with a particular event to facilitate improved searching of a library, for example (e.g., where a user can search by event instead of merely by procedure to retrieve event images pertinent to the event).

Figure 5:
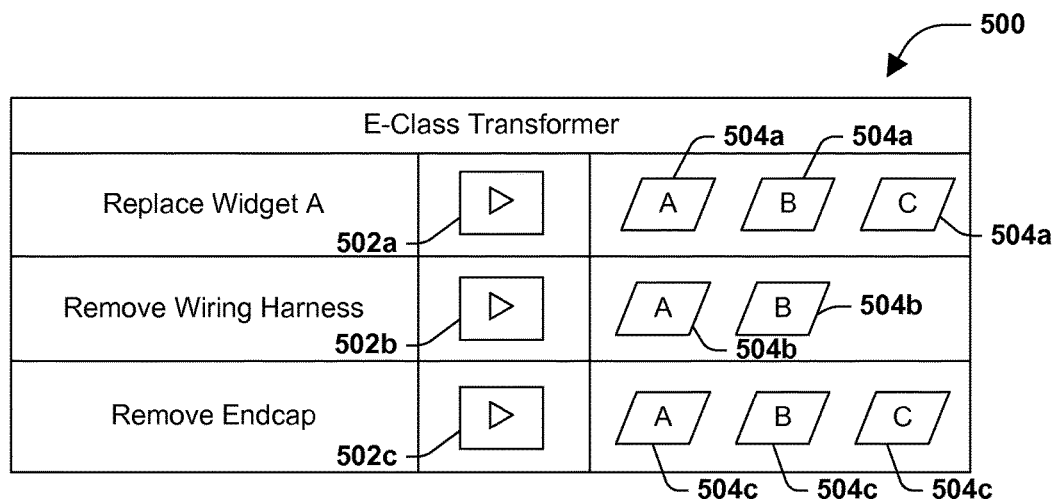
FIG. 5 illustrates an example library wherein event images may be stored.

Turning to FIG. 5, using the event images associated with one or more events and/or audio captured temporally proximate such events, a library 500 of events for an item of power equipment and/or class of power equipment may be developed. In this way, users may recall event images and/or audio corresponding to such events. For example, in the illustrated embodiment, the library 500 may comprises entries describing events performed on a class of transformers. Such events include replacing widget "A," removing a wiring harness, and removing an endcap. Associated with respective events may be an image file and/or audio file representative of the event. For example, in the illustrated embodiment, event images and corresponding audio (e.g., captured during the time window represented by the event images) may be merged into a video file 502, for example, and stored in the library 500. In this way, a user may select a video file 502 pertaining to an event, such as a video file 502a pertaining to replacing widget "A" and images of the event and/or audio corresponding to the event may be provided for display to the user, for example. As an example, a maintenance technician may be performing a maintenance procedure that, in part, includes removing a wiring harness on an e-class transformer. The maintenance technician may access the library 500 and select a video file 502b associated with removing the wiring harness to access images and/or audio describing how to remove the wiring harness.

In some embodiments, textual information 504, such as one or more documents 504a, 504b, 504c, etc. pertaining to an event (e.g., maintenance reports describing the event, repair guides, event checklist, safety warnings, tips for performing the event, etc.), may also be associated with the event in the library 500. For example, written instructions for replacing widget "A" may be associated with an entry in the library 500 for replacing widget "A." As another example, a checklist for removing a wiring harness may be associated with an entry in the library 500 for removing a wiring harness.

Turning to FIG. 6, an example method 600 for annotating textual information to an event image is provided. Using such a method 600, textual information may be appended to the event image for concurrent display with the event image (e.g., to supplement the event image and/or describe the contents of the event image), for example.

The example method 600 begins at 602, and at least one event image associated with a maintenance procedure is received at 604. By way of example, one or more event image pertaining to the replacement of widget "A" may be received at 604.

At 606 in the example method 600, the event image is annotated with textual information pertaining to the event. For example, the event image may be annotated with text of a repair guide, an event checklist, safety warnings pertaining to the event, and/or tips for performing the event. As another example, a maintenance report generated in response to a maintenance procedure which included the event may be annotated to the event image.

Annotating textual information to an event image may comprise associating textual information with the event image in a manner that causes the textual information and/or a representation of the textual information to be displayed when the event image is displayed. By way of example, a hyperlink to the repair guide and/or to the checklist may be embedded within the event image and/or may overlay the event image. In this way, while a user is viewing an event image, a user may navigate to the hyperlink to view additional information relevant to the event, such as the repair guide, for example.

In some embodiments, an entity may annotate the event image (e.g., such as by placing a text box within the image and typing a message in the text box and/or adding a hyperlink, directing a user to a document, within the text box). In other embodiments, the event image may be programmatically annotated. For example, a repair guide may be identified as being associated with the event and a hyperlink to a location where the repair guide is electronically stored may be programmatically inserted into an event image representative of the event. For example, the event may be associated with one or more keywords. Using such keywords, a search of databases may be performed to identify documents comprising and/or otherwise associated with such keywords, and the hyperlinks to the identified document(s) (e.g., the repair guide) may be annotated to the event image, for example.

In some embodiments, such an annotation comprises identifying a region within the event image in which to annotate the textual information. By way of example, in some embodiments, it may be desirable to not mask important aspects of the event image with textual information. Accordingly, analytical, iterative, or other techniques may be applied to the event image to identify a suitable region for annotating textual information. By way of example, connected component labeling techniques or other suitable techniques may be applied to the event image to identify a region of the image that is representative of empty space within a container. As another example, such techniques may be applied to identify regions within the image where the annotation would overlay a single object (e.g., so as to appear as through the text fits within the object and does not conceal a transition between objects and/or outer edges of the single object—where maintenance actions are more likely to occur).

At 608 in the example method 600, the event image and the annotated textual information is provided for display to a user, such as a maintenance technician. For example, in some embodiments, a user may make a request for an event image(s) associated with a particular event and the event image, including the annotated textual information, may be retrieved from a library in response to the request and provided for display to the user.

In some embodiments, the annotated textual information may be selectively displayed within the event image. By way of example, a user may select an option on a menu of a graphical user interface that causes the annotated textual information to be displayed or to not be displayed.

The example method 600 ends at 610.

Turning to FIG. 7, an example scenario for presenting an event image and/or annotated textual information to a user 700, such as a second maintenance technician, is illustrated. The user 700 is equipped with a display 702 for displaying the event images and/or annotated textual information and one or more devices configured to receive input from the user 700. By way of example, in the illustrated embodiment, the user 700 is equipped with an audio recorder 704 configured to receive voice commands and a wristwatch 706 configured to receive tactile commands, for example.

In the example embodiment, the display 702 and the audio recorder 704 are embedded within (e.g., mounted to) eyewear 708 worn by the user 700, such as safety glasses. In other embodiments, at least one of the display 702 and/or the audio recorder 704 may be embedded within other items wearable by the user 700. For example, the audio recorder 704 may be embedded within the wristwatch 706 and/or embedded within a pennant worn on the user's clothing. As another example, the display 702 may be mounted to a helmet worn by the user 700, for example.

In some embodiments, the display 702 is a heads-up display comprising a substantially transparent window upon which event images are projected.

In the example scenario, the audio recorder 704 is configured to receive voice commands from a user and to generate audio data, which may be used to initialize commands. For example, as part of a maintenance procedure, it may be desirable to replace a widget. However, the user 700 may be unfamiliar with one or more actions to be taken when replacing the widget. Accordingly, the user 700 may announce a command 710, such as "explain how to replace the widget." Such a command may be detected by the audio device 704 and/or processed by using a voice recognition technique, for example, to determine a process to initialize. For example, the voice recognition technique may determine from the audio data that the user wishes to view event images associated with replacing the widget. Accordingly, a search query may be devised for searching a library to retrieve such event images. Results of the search query may be displayed to the user 700 via the display 702.

Turning to FIG. 7b, a perspective 712 of the user 700 at the time the results are displayed is provided. As illustrated, both an object 714 upon which the maintenance procedure is performed and the display 702 are visible to the user 700. An event image 716 (e.g., a still image, video segment, etc.) related to replacing the widget may be displayed within the display 702 in response to the command. Also presented within the display 702 may be textual information 718 that has been annotated to the event image 716. For example, in the illustrated embodiment, the event image 716 has been annotated with a hyperlink to a manual describing the maintenance procedure and/or notes relevant to the event, such as tips written by other maintenance technicians that have performed a similar maintenance procedure and/or encountered a similar event. In some embodiments, the user 700 may interact with the textual information 718 to be presented with other textual information. For example, the user may navigate a cursor via the wristwatch 706 to a hyperlink for the manual, select the hyperlink, and be presented with second textual information corresponding to the selected textual information, such as the text of the manual, for example.

In some embodiments, such as in the illustrated embodiment, the display 702 and the event image 716 are at least partially transparent, allowing the user to view aspects of the object 714 that would otherwise be hidden from view if the display 702 and/or the event image 716 were opaque. In other embodiments, at least one of the display 702 and the event image 716 are substantially opaque. For example, the display 702 may be substantially transparent while event image 716 is substantially opaque (e.g., allowing the maintenance technician to see through the display 702 when no image is displayed and not to see through the display 702 when the event image 716 or other images are displayed).

Figure 8:
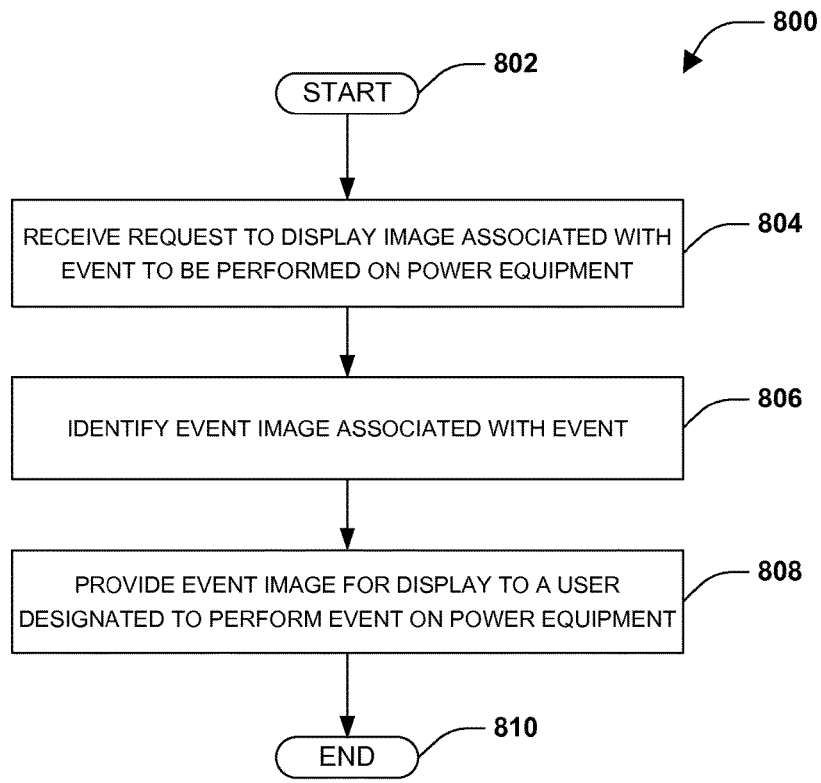
FIG. 8 is a flow diagram illustrating an example method for providing an event image for display to a user.

Turning to FIG. 8, an example method 800 for providing an event image for display to a user is provided. The method 800 begins at 802 and a request to display an image associated with an event to be performed on the power equipment is received at 804. By way of example, as described in the example scenario of FIG. 7, a user may encounter an unfamiliar situation during a maintenance procedure (e.g., such as encountering a component the user is not familiar with), and may issue a verbal or non-verbal command seeking event images associated with an event (e.g., how do I remove the widget). Based upon this command, a request may be generated to query an electronic library for event images, audio, and/or other information (e.g., such as textual information) associated with the event.

As another example, the user may be equipped with an image recorder configured to record the maintenance procedure. Based upon images recorded via the image recorder and/or audio recorded during the maintenance procedure, it may be determined that the user is about to perform a particular event and a request for images pertaining to the event may be generated and/or received. As an example, analytical, iterative, or other prediction techniques may analyze images and/or audio acquired during the maintenance procedure to predict an action the user is likely to perform next. For example, from the images, it may be determined that the user just removed a cover of a transformer. Accordingly, from historical data regarding similar maintenance procedures, it may be determined that the next action the user is likely to take relates to removing a wiring harness. Thus, a request for images associated with removing the wiring harness may be programmatically generated and received at 804.

At 806 in the example method 800, an event image associated with the event is identified. For example, a search query may be devised from the request and event images that satisfy one or more conditions of the request may be identified and/or retrieved at 806. For example, event images representative of a wiring harness being removed from the transformer or a similar transformer may be identified based upon the request.

At 808 in the example method 800, the event image(s) are provided for display to a user designated to perform the event on the power equipment. By way of example, the event image(s) identified and/or retrieved at 806 may be transmitted to a display viewable by the user, such as a wearable display (e.g., a display mounted to eyewear, a wristwatch, a helmet, etc.). In some embodiments, the display is a heads-up display that is at least partially transparent (e.g., allowing the user to see objects in a line of sight that is intersected by the display).

At 810, the example method 800 ends.

Figure 9:
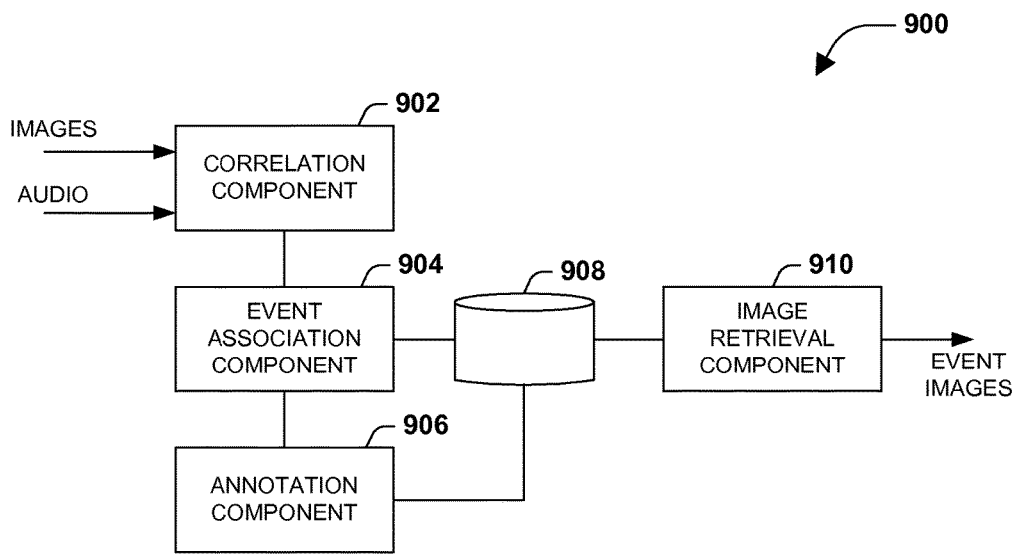
FIG. 9 is a component block diagram of an example system for identifying an event image of an event associated with power equipment.

FIG. 9 illustrates an example system 900 configured to receive images and/or audio recording during a maintenance procedure, identify a subset of the recorded images associated with an event (e.g., identify event images), store the event images, and/or provide such event images for display to other entities, such as entities performing similar maintenance procedures and/or performing similar events, for example.

The example system 900 comprises a correlation component 902, an event association component 904, an annotation component 906, a library 908, and an image retrieval component 910.

The correlation component 902 is configured to capture images via an image recorder (e.g., such as a camera mounted to eyewear, a helmet, wristwatch, etc.) and to capture audio recorded via an audio recorder (e.g., such as a microphone mounted to eyewear, a helmet, a wristwatch, etc.). The correlation component 902 is also configured to temporally correlate the images with the audio such that audio captured during a particular instance of time can be heard at the same time one or more images captured during the same instance of time is displayed on a screen, for example.

The event association component 904 is configured to identify, based upon the audio, when an event occurs and to identify, based upon the temporal correlation, one or more event images from the images received by the correlation component 902. By way of example, the event association component 904 may be configured to utilize voice recognition techniques and/or techniques configured to identify events from non-verbal cues (e.g., such as identifying critical actions by detecting stress in the voice of the maintenance technician) to identify instances where one or more events are occurring during the maintenance procedure.

When an event is identified from the audio, the event association component 904 may sift through the images to identify images associated with (e.g., depicting) the event. Such images may be referred to as event images. For example, if an event is identified as occurring at time X in the audio file, the event association component 904 may review the recorded images to identify one or more images captured at approximately time X (e.g., where the correlation by the correlation component 902 may be used to determine what image(s) were captured at approximately time X). In some embodiments, the event association component 904 is further configured to store the event image(s) associated with an event and/or corresponding audio in the library 908.

The annotation component 906 is configured to annotate an event image identified by the event association component with textual information, such as tips for performing the event, links to a repair guide, etc. By way of example, the annotation component 906 may embed, within the event image, a hyperlink to a maintenance report created by a maintenance technician after the maintenance procedure detailing how he/she performed the event. As another example, the maintenance technician may review the event image and highlight or otherwise draw a user's attention to a particular aspect of the event image and the annotation component 906 may annotate the event image based upon the maintenance technician's review, for example.

While specific reference is made to embedding such annotations within the image, it may be appreciated that in other embodiments, one or more such annotations may be coupled to the event image without altering the image data in a manner that causes the textual information to be embedded within the event image. By way of example, the annotation component 906 may overlay the event image with the textual information (e.g., by describing geometric coordinates within the event image where it is desirable to display the textual information) such that, when the event image is displayed, the textual information is displayed as an overlay to the event image (e.g., such that an appearance of the textual information within the event image is created).

In some embodiments, textual information that is relevant to an event may be identified from the captured audio. By way of example, a maintenance technician performing the event may verbally note that a particular manual comprises detailed instruction and/or photographs for performing the event. Such a notation may be identified by a voice recognition technique, for example, and the annotation component 906 may search one or more databases for such a manual and/or may annotate a hyperlink to an event image, where the hyperlink directs users viewing the event image to the manual. In some embodiments, the textual information is stored in the library 908.

The image retrieval component 910 is configured to retrieve one or more event images satisfying a request when such a request is made. For example, a request for event images pertaining to removing a wiring harness from a particular class of turbine may be received by the image retrieval component (e.g., from the user 700 in FIG. 7) and the image retrieval component 910 may generate a search query for searching the library 908 for such event images. Event images that satisfy the request, if any, may be retrieved from the library 908 by the image retrieval component 910 and may be transmitted to a display configured to present the user requesting such images with the retrieved event image(s), for example.

It may be appreciated that while specific reference is made to retrieving event images, other information associated with such an event may also be retrieved. For example, audio captured when the event images were recorded may also be retrieved by the image retrieval component 910 (e.g., so that the user making the request can also hear a description of how the event is performed). As another example, textual information pertaining to the event, such as annotated to one or more event images, may be retrieved by the image retrieval component 910 and/or transmitted to a user for presentation on the display, for example.

It may also be appreciated that the arrangement of components described herein is merely an example arrangement. By way of example, in another embodiment, the annotation component 906 may annotate images prior to the event association component 904 associating an event with a particular set of one or more images. As another example, the annotation component 906 may annotate images before the correlation component 902 correlates images with audio.

Figure 10:
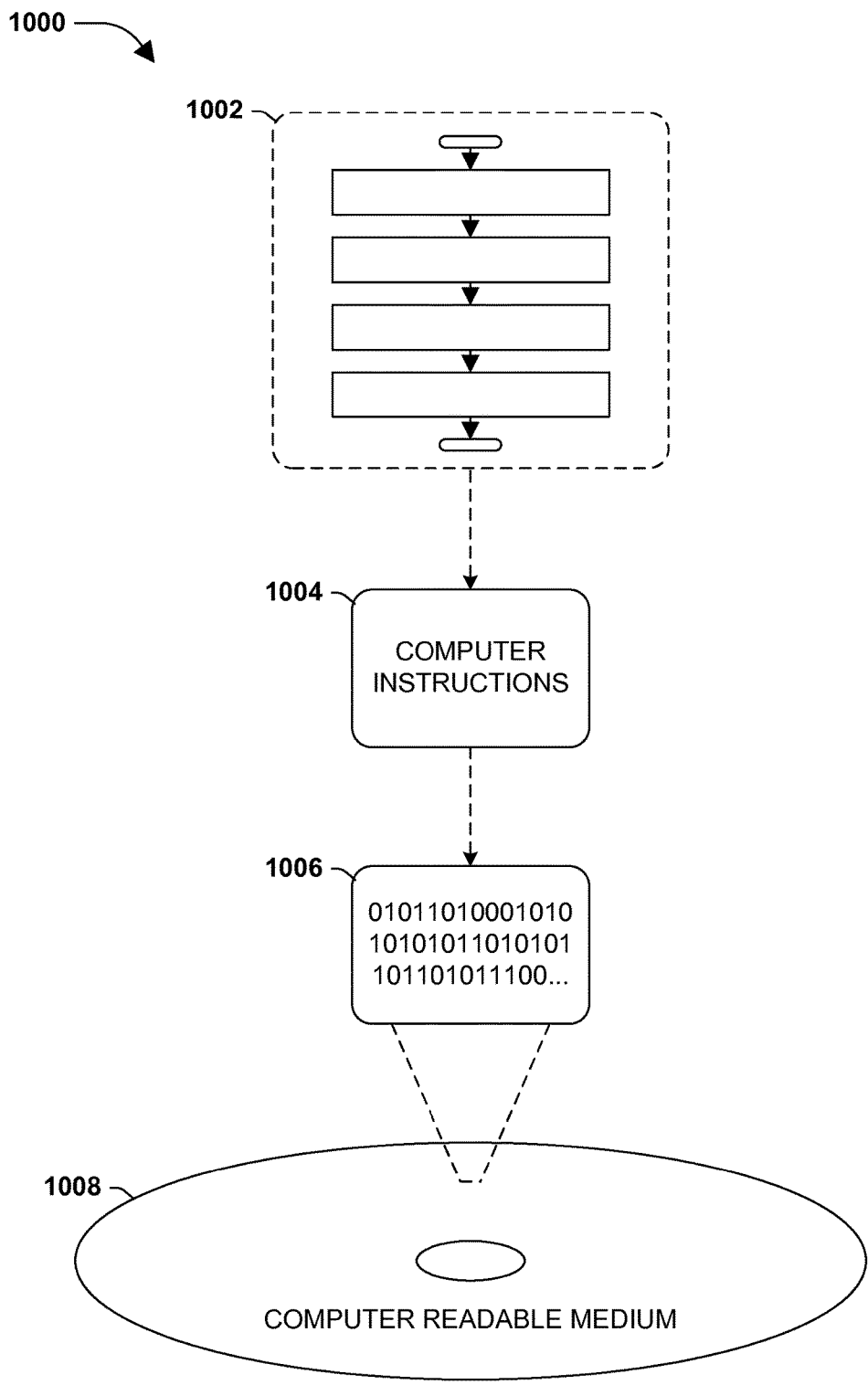
FIG. 10 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An example computer-readable medium that may be devised in these ways is illustrated in FIG. 10, wherein the implementation 1000 comprises a computer-readable medium 1008 (e.g., a flash drive, CD-R, DVD-R, application-specific integrated circuit (ASIC), field-programmable gate array (FPGA), a platter of a hard disk drive, etc.), on which is encoded computer-readable data 1006. This computer-readable data 1006 in turn comprises a set of processor-executable instructions 1004 that when executed via a processing unit(s) is configured to operate according to one or more of the principles set forth herein. In some embodiments, the processor-executable instructions 1004 may be configured to perform a method 1002, such as at least some of the example method 100 of FIG. 1, at least some of the example method 600 of FIG. 6, and/or at least some of the example method 800 of FIG. 8, for example. In other embodiments, the processor-executable instructions 1004 may be configured to implement a system, such as at least some of the example system 900 of FIG. 9, for example. Many such computer-readable media may be devised by those of ordinary skill in the art that are configured to operate in accordance with one or more of the techniques presented herein.

Figure 11:
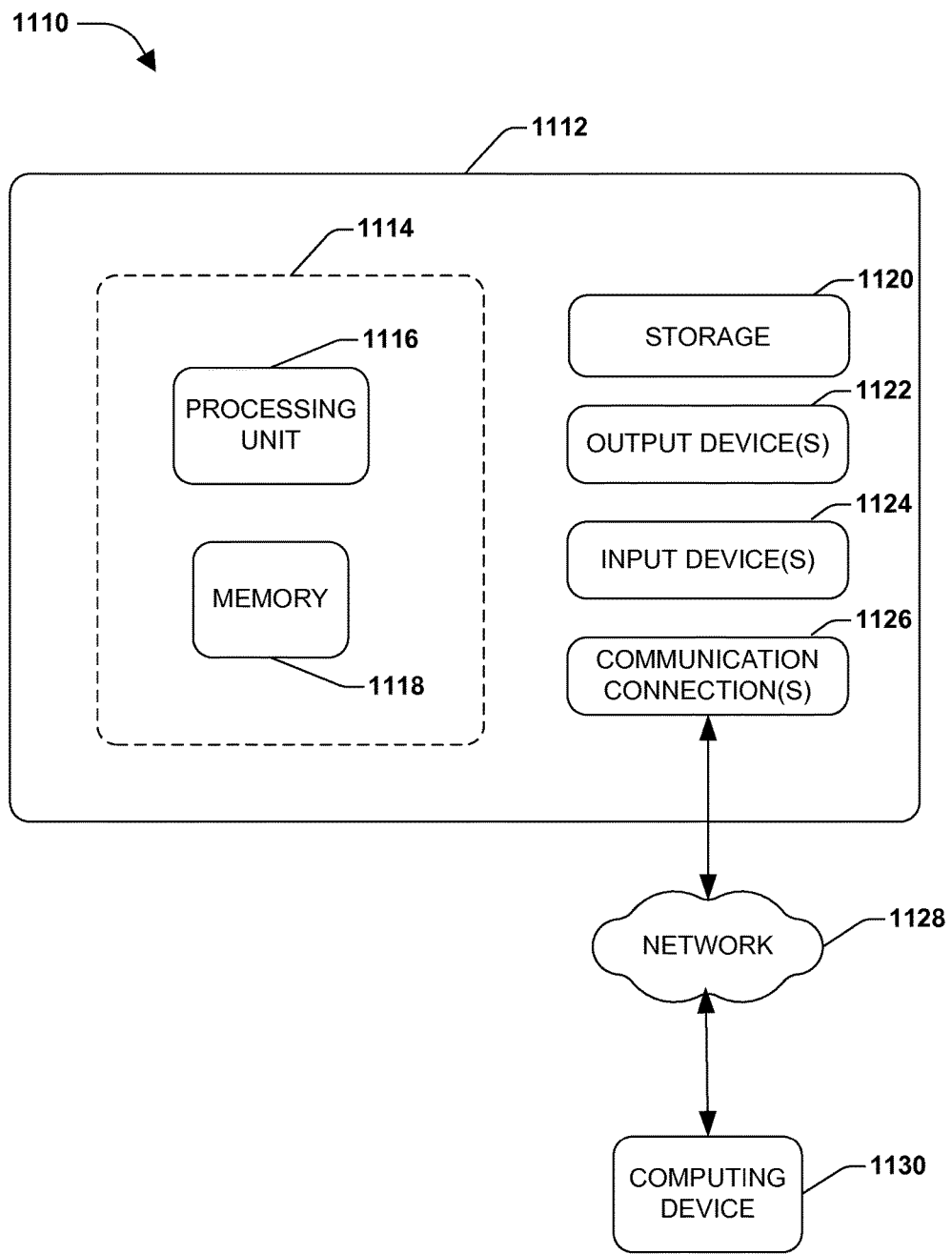
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example), or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via a network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description.

Further, it will be understood that not all operations are necessarily present in each embodiment provided herein.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B," where channel A and channel B may be two different channels, two identical channels, or the same channel.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    recording, via a wearable image recorder, images associated with a maintenance procedure;
    recording, via a wearable audio recorder, audio associated with the maintenance procedure;
    filtering images associated with events in the maintenance procedure from images not associated with events in the maintenance procedure based upon whether each image is associated with events in the maintenance procedure or is not associated with events in the maintenance procedure, the filtering comprising:
        analyzing the audio and the images to identify a plurality of events, comprising a first event, a second event, a third event and a fourth event, of the maintenance procedure, the analyzing comprising:
            identifying the first event based upon a non-verbal cue, in the audio, indicative of a vibration determined to indicate a failure of a first part in power equipment based upon a match between the non-verbal cue and a first audio indication paired with the first event in an audio library;
            identifying the second event based upon a vocal change determined to indicate an increase in stress associated with a technician based upon a match between the vocal change and a second audio indication paired with the second event in the audio library;
            identifying the third event based upon a keyword recognized via voice recognition in the audio, the identifying the third event based upon a match between the keyword and a third audio indication paired with the third event in the audio library; and
            identifying the fourth event based upon a trigger image, recognized via image analysis in the images, indicative of a start of the fourth event;
        determining that a first portion of the images and a first portion of the audio are associated with the first event based upon an analysis of timestamps in metadata associated with the first portion of the images and timestamps in metadata associated with the first portion of the audio;
        determining that a second portion of the images and a second portion of the audio are associated with the second event based upon an analysis of timestamps in metadata associated with the second portion of the images and timestamps in metadata associated with the second portion of the audio;
        determining that a third portion of the images and a third portion of the audio are associated with the third event based upon an analysis of timestamps in metadata associated with the third portion of the images and timestamps in metadata associated with the third portion of the audio;

determining that a fourth portion of the images and a fourth portion of the audio are associated with the fourth event based upon an analysis of timestamps in metadata associated with the fourth portion of the images and timestamps in metadata associated with the fourth portion of the audio; and determining that a fifth portion of the images and a fifth portion of the audio are associated with routine actions in the maintenance procedure based upon an analysis of timestamps in metadata associated with the fifth portion of the images and timestamps in metadata associated with the fifth portion of the audio;

generating a library of events associated with the power equipment, the generating comprising:

responsive to determining that the first portion of the images and the first portion of the audio are associated with the first event, storing the first portion of the images and the first portion of the audio in a database of the library in association with the first event;

responsive to determining that the second portion of the images and the second portion of the audio are associated with the second event, storing the second portion of the images and the second portion of the audio in the database of the library in association with the second event;

responsive to determining that the third portion of the images and the third portion of the audio are associated with the third event, storing the third portion of the images and the third portion of the audio in the database of the library in association with the third event;

responsive to determining that the fourth portion of the images and the fourth portion of the audio are associated with the fourth event, storing the fourth portion of the images and the fourth portion of the audio in the database of the library in association with the fourth event; and responsive to determining that the fifth portion of the images and the fifth portion of the audio are associated with the routine actions in the maintenance procedure, discarding the fifth portion of the images and the fifth portion of the audio to mitigate storage space to be consumed by a presentation associated with the maintenance procedure and to mitigate a temporal length of the presentation;

responsive to receiving a request from a user for images corresponding to performance of an event, identifying, in the library, a portion of the images and a portion of the audio indicative of the event;

analyzing the event to identify one or more keywords associated with the event specified by the request from the user;

responsive to identifying the one or more keywords, searching one or more databases, based upon the one or more keywords, to identify one or more documents associated with the event;

responsive to identifying the one or more documents, programmatically annotating textual information associated with the one or more documents to an event image in the portion of the images indicative of the event;

generating an audio-visual depiction of performance of the event based upon a combination of the portion of the images indicative of the event, the portion of the audio indicative of the event and the annotated textual information; and controlling a graphical user interface to cause a screen to display an image stream of the audio-visual depiction of performance of the event while controlling a speaker to play an audio stream of the audio-visual depiction of performance of the event.

2. The method of claim 1, the wearable image recorder comprising an image recorder coupled to eyewear and the wearable audio recorder comprising an audio recorder coupled to at least one of a helmet, a wristwatch or a pennant.

3. The method of claim 1, the generating comprising:
merging the image stream with the audio stream for storage as a single file in a multimedia format.

4. The method of claim 1, comprising determining a time window for images and audio associated with each of the events using a start time identified based upon the identification of the corresponding event and an end time that is a defined amount of time after the start time.

5. The method of claim 1, the displaying performed via a heads-up display.

6. The method of claim 1, comprising determining a time window for images and audio associated with each of the events using a start time identified based upon the identification of the corresponding event and an end time identified based upon an identification of a spoken keyword, in the audio, determined to match a defined indicator of an end of an action.

7. The method of claim 1, the maintenance procedure comprising replacing a component of the power equipment, the first event comprising removing clips to access the component, the second event comprising uncoupling a wire harness to access the component, and the third event of the maintenance procedure comprising removing a screw to decouple the component from the power equipment.

8. The method of claim 1, the annotating the textual information comprising annotating the portion of the images associated with the event with a hyperlink to the one or more documents.

9. The method of claim 8, the hyperlink selectable via the graphical user interface.

10. A system, comprising:
an image recorder configured to capture images of power equipment associated with a maintenance procedure;
an audio recorder configured to capture audio associated with the maintenance procedure;
a filter configured to filter images associated with events in the maintenance procedure from images not associated with events in the maintenance procedure based upon whether each image is associated with events in the maintenance procedure or is not associated with events in the maintenance procedure, the filtering comprising:
analyzing the audio and the images to identify a plurality of events, comprising a first event, a second event, a third event, and a fourth event, of the maintenance procedure, the analyzing comprising:
identifying the first event based upon a non-verbal cue, in the audio, indicative of a vibration determined to indicate a failure of a first part in the power equipment based upon a match between the non-verbal cue and a first audio indication paired with the first event in an audio library;
identifying the second event based upon a vocal change determined to indicate an increase in stress associated with a technician based upon a match between the vocal change and a second audio indication paired with the second event in the audio library;

identifying the third event based upon a keyword recognized via voice recognition in the audio, the identifying the third event based upon a match between the keyword and a third audio indication paired with the third event in the audio library; and identifying the fourth event based upon a trigger image, recognized via image analysis in the images, indicative of a start of the fourth event;

determining that a first portion of the images and a first portion of the audio are associated with the first event based upon an analysis of timestamps in metadata associated with the first portion of the images and timestamps in metadata associated with the first portion of the audio;

determining that a second portion of the images and a second portion of the audio are associated with the second event based upon an analysis of timestamps in metadata associated with the second portion of the images and timestamps in metadata associated with the second portion of the audio;

determining that a third portion of the images and a third portion of the audio are associated with the third event based upon an analysis of timestamps in metadata associated with the third portion of the images and timestamps in metadata associated with the third portion of the audio;

determining that a fourth portion of the images and a fourth portion of the audio are associated with the fourth event based upon an analysis of timestamps in metadata associated with the fourth portion of the images and timestamps in metadata associated with the fourth portion of the audio; and determining that a fifth portion of the images and a fifth portion of the audio are associated with routine actions in the maintenance procedure based upon an analysis of timestamps in metadata associated with the fifth portion of the images and timestamps in metadata associated with the fifth portion of the audio;

a generator configured to generate a library of events associated with the power equipment, the generating comprising:

responsive to determining that the first portion of the images and the first portion of the audio are associated with the first event, storing the first portion of the images and the first portion of the audio in a database of the library in association with the first event;

responsive to determining that the second portion of the images and the second portion of the audio are associated with the second event, storing the second portion of the images and the second portion of the audio in the database of the library in association with the second event;

responsive to determining that the third portion of the images and the third portion of the audio are associated with the third event, storing the third portion of the images and the third portion of the audio in the database of the library in association with the third event;

responsive to determining that the fourth portion of the images and the fourth portion of the audio are associated with the fourth event, storing the fourth portion of the images and the fourth portion of the audio in the database of the library in association with the fourth event; and responsive to determining that the fifth portion of the images and the fifth portion of the audio are associated with the routine actions in the maintenance procedure, discarding the fifth portion of the images and the fifth portion of the audio to mitigate storage space to be consumed by a presentation associated with the maintenance procedure and to mitigate a temporal length of the presentation; and an image retrieval component configured to:

responsive to receiving a request from a user for images corresponding to performance of an event, identify, in the library, a portion of the images and a portion of the audio indicative of the event;

analyze the event to identify one or more keywords associated with the event specified by the request from the user;

responsive to identifying the one or more keywords, search one or more databases, based upon the one or more keywords, to identify one or more documents associated with the event;

responsive to identifying the one or more documents, programmatically annotate textual information associated with the one or more documents to an event image in the portion of the images indicative of the event;

generate an audio-visual depiction of performance of the event based upon a combination of the portion of the images indicative of the event, the portion of the audio indicative of the event and the annotated textual information; and control a graphical user interface to cause a screen to display an image stream of the audio-visual depiction of performance of the event while controlling a speaker to play an audio stream of the audio-visual depiction of performance of the event.

11. The system of claim 10, the image recorder coupled to at least one of a helmet or eyewear.

12. The system of claim 11, at least one of the helmet or the eyewear comprising a heads-up display.

13. The system of claim 10, the analyzing comprising detecting a signature, of a keyword associated with the first event, in an intensity graph representative of an intensity of at least some of the audio.

14. The system of claim 10, the textual information comprising a hyperlink to the one or more documents, the hyperlink selectable via the graphical user interface.

15. The system of claim 10, comprising a display coupled to a helmet and configured to display at least some of the images.

16. The system of claim 10, the maintenance procedure comprising replacing a component of the power equipment, the first event comprising removing clips to access the component, the second event comprising uncoupling a wire harness to access the component, and the third event of the maintenance procedure comprising removing a screw to decouple the component from the power equipment.

17. The system of claim 10, comprising a display coupled to eyewear and configured to display at least some of the images.

18. The system of claim 10, comprising:
a heads-up display configured to display the portion of the images.

19. The system of claim 10, the image retrieval component configured to retrieve at least one of:

textual information associated with the portion of the images; or the portion of the audio.

20. A non-transitory computer-readable medium comprising instructions that when executed perform a method, comprising:

recording, via an image recorder, images associated with a maintenance procedure;

recording, via an audio recorder, audio associated with the maintenance procedure;

filtering images associated with events in the maintenance procedure from images not associated with events in the maintenance procedure based upon whether each image is associated with events in the maintenance procedure or is not associated with events in the maintenance procedure, the filtering comprising:

analyzing the audio and the images to identify a plurality of events, comprising a first event, a second event, a third event, and a fourth event, of the maintenance procedure, the analyzing comprising:

identifying the first event based upon a non-verbal cue, in the audio, indicative of a vibration determined to indicate a failure of a first part in power equipment based upon a match between the non-verbal cue and a first audio indication paired with the first event in an audio library;

identifying the second event based upon a vocal change determined to indicate an increase in stress associated with a technician based upon a match between the vocal change and a second audio indication paired with the second event in the audio library;

identifying the third event based upon a keyword recognized via voice recognition in the audio, the identifying the third event based upon a match between the keyword and a third audio indication paired with the third event in the audio library; and identifying the fourth event based upon a trigger image, recognized via image analysis in the images, indicative of a start of the fourth event;

determining that a first portion of the images and a first portion of the audio are associated with the first event based upon an analysis of timestamps in metadata associated with the first portion of the images and timestamps in metadata associated with the first portion of the audio;

determining that a second portion of the images and a second portion of the audio are associated with the second event based upon an analysis of timestamps in metadata associated with the second portion of the images and timestamps in metadata associated with the second portion of the audio;

determining that a third portion of the images and a third portion of the audio are associated with the third event based upon an analysis of timestamps in metadata associated with the third portion of the images and timestamps in metadata associated with the third portion of the audio;

determining that a fourth portion of the images and a fourth portion of the audio are associated with the fourth event based upon an analysis of timestamps in metadata associated with the fourth portion of the images and timestamps in metadata associated with the fourth portion of the audio; and determining that a fifth portion of the images and a fifth portion of the audio are associated with routine actions in the maintenance procedure based upon an analysis of timestamps in metadata associated with the fifth portion of the images and timestamps in metadata associated with the fifth portion of the audio;

generating a library of events associated with the power equipment, the generating comprising:

responsive to determining that the first portion of the images and the first portion of the audio are associated with the first event, storing the first portion of the images and the first portion of the audio in a database of the library in association with the first event;

responsive to determining that the second portion of the images and the second portion of the audio are associated with the second event, storing the second portion of the images and the second portion of the audio in the database of the library in association with the second event;

responsive to determining that the third portion of the images and the third portion of the audio are associated with the third event, storing the third portion of the images and the third portion of the audio in the database of the library in association with the third event;

responsive to determining that the fourth portion of the images and the fourth portion of the audio are associated with the fourth event, storing the fourth portion of the images and the fourth portion of the audio in the database of the library in association with the fourth event; and responsive to determining that the fifth portion of the images and the fifth portion of the audio are associated with the routine actions in the maintenance procedure, discarding the fifth portion of the images and the fifth portion of the audio to mitigate storage space to be consumed by a presentation associated with the maintenance procedure and to mitigate a temporal length of the presentation;

responsive to receiving a request from a user for images corresponding to performance of an event, identifying, in the library, a portion of the images and a portion of the audio indicative of the event;

analyzing the event to identify one or more keywords associated with the event specified by the request from the user;

responsive to identifying the one or more keywords, searching one or more databases, based upon the one or more keywords, to identify one or more documents associated with the event;

responsive to identifying the one or more documents, programmatically annotating textual information associated with the one or more documents to an event image in the first portion of the images indicative of the event;

generating an audio-visual depiction of performance of the event based upon a combination of the portion of the images indicative of the event, the portion of the audio indicative of the event, and the annotated textual information; and controlling a graphical user interface to cause a screen to display an image stream of the audio-visual depiction of performance of the event while controlling a speaker to play an audio stream of the audio-visual depiction of performance of the event.

* * * * *